US 7,434,011 B2

(12) United States Patent
Shue

(10) Patent No.: US 7,434,011 B2
(45) Date of Patent: Oct. 7, 2008

(54) APPARATUS, SYSTEM, AND METHOD FOR MODIFYING DATA STORAGE CONFIGURATION

(75) Inventor: Douglas Yellow Shue, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 11/204,437

(22) Filed: Aug. 16, 2005

(65) Prior Publication Data
US 2007/0043923 A1 Feb. 22, 2007

(51) Int. Cl.
*G06F 12/00* (2006.01)
(52) U.S. Cl. .................. 711/156; 711/170; 709/224; 709/226; 700/31; 700/34; 700/47
(58) Field of Classification Search .................. 711/156
See application file for complete search history.

(56) References Cited

U.S. PATENT DOCUMENTS

| 6,745,212 B2 | 6/2004 | Kishi et al. .................. 707/204 |
| 6,832,236 B1 * | 12/2004 | Hamilton et al. ............ 718/100 |
| 6,832,248 B1 * | 12/2004 | Byrnes ........................ 709/223 |
| 7,092,975 B2 * | 8/2006 | Bradley et al. .............. 707/204 |
| 7,103,733 B2 * | 9/2006 | Asano et al. ................. 711/156 |
| 7,246,105 B2 * | 7/2007 | Numanoi et al. ............... 707/1 |
| 2002/0073268 A1 | 6/2002 | Peloquin et al. ............... 711/6 |
| 2002/0091746 A1 | 7/2002 | Umberger et al. ........... 709/105 |
| 2002/0152181 A1 * | 10/2002 | Kanai et al. .................... 705/80 |
| 2004/0054648 A1 * | 3/2004 | Mogi et al. .................... 707/1 |
| 2004/0162958 A1 | 8/2004 | Kano et al. ................. 711/170 |
| 2005/0154576 A1 * | 7/2005 | Tarui et al. .................... 703/22 |

OTHER PUBLICATIONS

Baltazar, Henry, "Staying in Control", Mar. 2003, eWeek, vol. 20 No. 12, p. 1.*
Ed Wilks, et al., IBM Standard Software Installer (ISSI), RD n439 Nov. 2000 Article 140 p. 2023.

* cited by examiner

*Primary Examiner*—Brian R. Peugh
*Assistant Examiner*—Kalpit Parikh
(74) *Attorney, Agent, or Firm*—Kunzler & McKenzie

(57) ABSTRACT

An apparatus, system, and method are disclosed for modifying storage configuration. A monitor module monitors a storage fullness of a storage configuration. If the storage fullness exceeds a policy threshold, a modification module modifies the storage configuration. If the storage fullness does not exceed the policy threshold, an analysis module analyzes a system state and compares the system state with a trend algorithm. If the storage fullness exceeds a discretionary threshold and the system state satisfies the trend algorithm, the modification module modifies the storage configuration.

12 Claims, 8 Drawing Sheets

APPARATUS, SYSTEM, AND METHOD FOR MODIFYING DATA STORAGE CONFIGURATION

BACKGROUND OF THE INVENTION

1. Field of the Invention

This invention relates to configuring data storage and more particularly relates to automatically modifying data storage configuration.

2. Description of the Related Art

A data processing system often comprises a plurality of data processing devices such as servers, mainframe computers, and computer workstations. The data processing devices may employ internal data storage devices such as solid-state memory and hard disk drives to store data. In addition, the data processing devices may employ one or more external data storage devices such as hard disk drives, optical storage devices, magnetic tape drives, and the like to store data. Each data storage device may be configured with one or more physical partitions.

The data storage devices may be organized as one or more logical volumes wherein each logical volume may comprise a file system. The file system typically comprises a plurality of logical directories that may include a plurality of sub directories. Each directory may specify the location of data on the data storage device and also comprise pointers to one or more directories and one or more data files. An operating system such as the AIX operating system from International Business Machines Corporation ("IBM") of Armonk, N.Y. or the Linux operating system may employ the file system to store and retrieve data including software instructions and digital information.

A logical volume may comprise one or more logical partitions. Each logical partition may comprise a physical partition on a data storage device. The logical partitions and/or physical partitions comprising the logical volume are the storage configuration of the logical volume.

A data processing system operator may modify the storage configuration of the logical volume to accommodate changing data storage requirements. For example, the operator may accommodate increased data storage requirements by adding logical partitions to the logical volume. Alternatively, the operator may remove logical partitions from the logical volume to reduce the data processing system resources employed by the logical volume.

Unfortunately, the data storage requirements for the file system may change too rapidly for the operator to modify the storage configuration to both satisfy data storage requirements and most efficiently employ data storage device resources. In addition, the operator may be unable to effectively monitor and modify the storage configurations for a plurality of logical volumes residing on the data processing system. The operator may also be unavailable to monitor and modify the storage configurations off-shift and on weekends. Finally, using an operator to monitor and modify storage configuration is inherently costly.

From the foregoing discussion, it should be apparent that a need exists for an apparatus, system, and method that automatically modify a storage configuration. Beneficially, such an apparatus, system, and method would modify the storage configuration to match data storage device resources with data storage requirements.

SUMMARY OF THE INVENTION

The present invention has been developed in response to the present state of the art, and in particular, in response to the problems and needs in the art that have not yet been fully solved by currently available storage configuration modification methods. Accordingly, the present invention has been developed to provide an apparatus, system, and method for modifying a storage configuration that overcome many or all of the above-discussed shortcomings in the art.

The apparatus to modify storage configuration is provided with a logic unit containing a plurality of modules configured to functionally execute the necessary steps of monitoring a storage fullness, modifying a storage configuration if the storage fullness exceeds a policy threshold, and modifying the storage configuration if the storage fullness exceeds a discretionary threshold and a system state satisfies a trend algorithm. These modules in the described embodiments include a monitor module, an analysis module, and a modification module.

The monitor module monitors a storage fullness of a storage configuration for a logical volume. In one embodiment, the storage fullness is represented as the percentage of the logical volume that is used to store data. For example, storage fullness may be fifty percent (50%) if half of the data blocks comprised by the logical volume are employed to store data. In an alternate embodiment, the storage fullness is represented the quantity of stored in bytes such as gigabytes or megabytes. Storage fullness may also be represented by the number of data blocks.

The analysis module analyzes a system state and compares the system state to a trend algorithm. The system state comprises system state data from one or more sources. In one embodiment, the system state data includes a data storage consumption history. The system state data may also include storage input/output operation data. The trend algorithm may comprise one or more system state trends that forecast required changes in the storage configuration. For example, the trend algorithm may comprise the slope of the storage fullness from the data consumption history.

The modification module modifies the storage configuration if the storage fullness exceeds a policy threshold. The policy threshold specifies a storage fullness. For example, the policy threshold may be specified as an eighty percent (80%) storage fullness. The modification module may modify the storage configuration such as by directing the addition of logical partitions to the logical volume if the storage fullness of the logical volume exceeds eighty percent (80%). In an alternate embodiment, the policy threshold may be thirty percent (30%) and the modification module may remove logical partitions from the logical volume if the storage fullness of the logical volume is less than thirty percent (30%).

The modification module also modifies the storage configuration if the storage fullness exceeds a discretionary threshold and the system state satisfies the trend algorithm. An operator may specify the discretionary threshold. The discretionary threshold specifies a storage fullness that may represent a reduced storage fullness from the policy threshold. For example, if the policy threshold is eighty percent (80%), the discretionary threshold may be seventy-five percent (75%). The modification module may modify the storage configuration such as by directing the addition of logical partitions to the logical volume if the storage fullness exceeds the discretionary threshold of seventy-five percent (75%) and if the system state satisfies the trend algorithm. The apparatus automatically modifies the storage configuration to efficiently support storage requirements.

A system of the present invention is also presented to modify storage configuration. The system may be embodied in a data processing system. In particular, the system, in one embodiment, includes a data storage device, a server, and a storage analyzer module. The storage analyzer module comprises a monitor module, an analysis module, and a modification module.

The data storage device stores data. In addition, the data storage device may comprise one or more physical partitions. In one embodiment, a logical volume comprises a plurality of logical partitions. Each logical partition may comprise a physical partition of the data storage device. The server executes one or more software processes including one or more software processes comprising the storage analyzer module.

The monitor module monitors the storage fullness of a storage configuration of the logical volume. The analysis module analyzes a system state and compares the system state to a trend algorithm. The modification module modifies the storage configuration if the storage fullness exceeds a policy threshold. The modification module also modifies the storage configuration if the storage fullness exceeds a discretionary threshold and the system state satisfies the trend algorithm. The system automatically monitors and modifies the storage configuration to efficiently match the storage configuration to storage requirements.

A method of the present invention is also presented for modifying a storage configuration. The method in the disclosed embodiments substantially includes the steps necessary to carry out the functions presented above with respect to the operation of the described apparatus and system. In one embodiment, the method includes monitoring a storage fullness, modifying a storage configuration if the storage fullness exceeds a policy threshold, and modifying the storage configuration if the storage fullness exceeds a discretionary threshold and a system state satisfies a trend algorithm. The method also may include acquiring system state data and communicating with an analyzer module.

A monitor module monitors a storage fullness of a storage configuration. If the storage fullness exceeds a policy threshold, a modification module modifies the storage configuration. In one embodiment, an analyzer communication module also communicates the storage configuration to one or more analyzer modules to orchestrate system management.

If the storage fullness does not exceed the policy threshold, a system state module may acquire system state data that comprises a system state. In addition, the analyzer communication module may communicate system state data with the analyzer module. An analysis module analyzes the system state and compares the system state with a trend algorithm. If the storage fullness exceeds a discretionary threshold and the system state satisfies the trend algorithm, the modification module modifies the storage configuration and the analyzer communication module may also communicate the storage configuration modification to the analyzer module. The method automatically modifies the storage configuration to meet storage requirements.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention automatically modifies a storage configuration to meet storage requirements. In addition, the present invention may automatically modify the storage configuration to satisfy storage requirements forecast by a trend algorithm. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
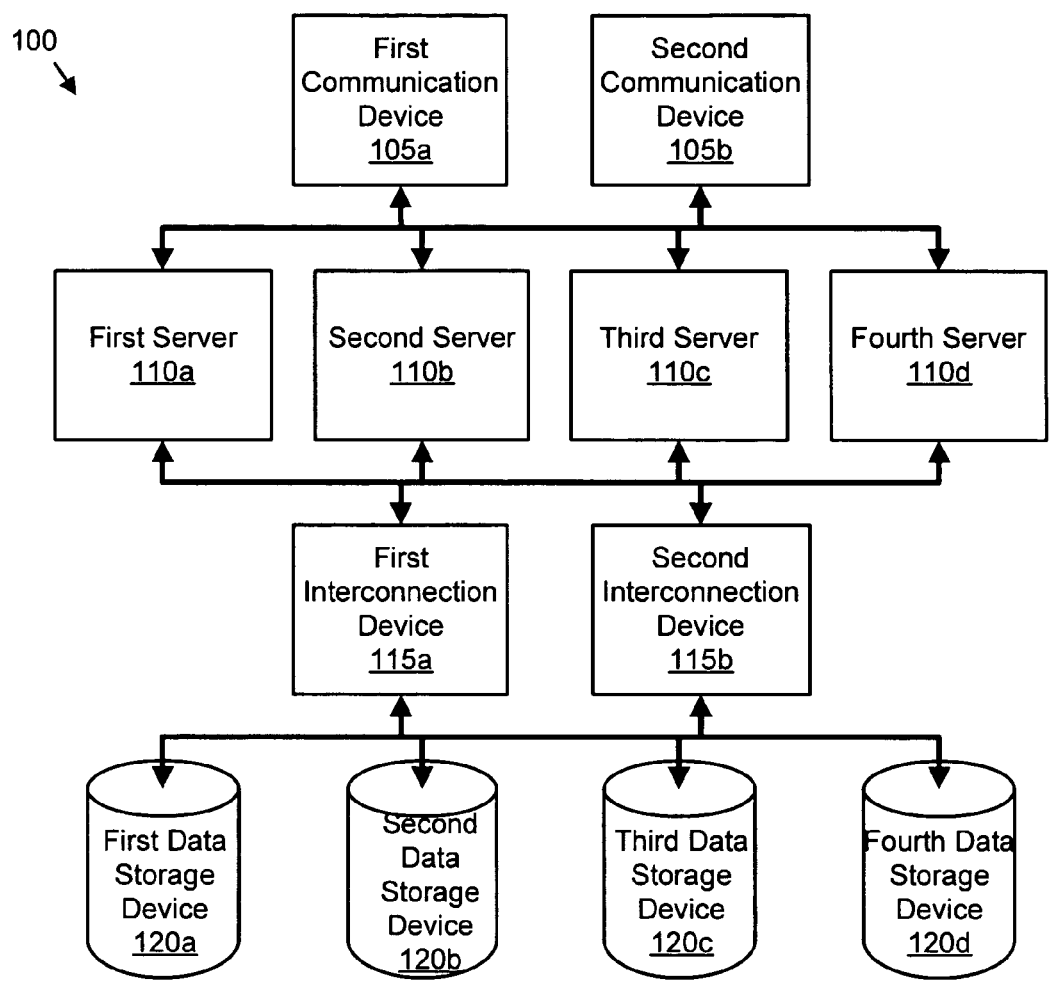
FIG. 1 is a schematic block diagram illustrating one embodiment of a data processing system in accordance with the present invention.

FIG. 1 is a schematic block diagram illustrating one embodiment of a data processing system 100 in accordance with the present invention. The system 100 includes one or more communication devices 105, one or more servers 110, one or more interconnection devices 115, and one or more data storage devices 120. Although for simplicity the system 100 is depicted with two communication devices 105, four servers 110, two interconnection devices 115, and four data storage devices 120, any number of communication devices 105, servers 110, interconnection devices 115, and data storage devices 120 may be employed.

The server 110 may communicate through the communication device 105 with one or more clients including computer workstations, laptop computers, personal digital assistants, cellular telephones, and the like. Communications from the communication device 105 may include wide area network communication, local area network communication, and wireless communication. The communication device 105 may be a router, a network interface, or the like.

The server 110 processes data as is well known to those skilled in the art. For example, the server 110 may execute a data base application for a remote client in communication with the server 110 through the communication device 105. The server 110 may include one or more internal data storage devices such as hard disk drives, micromechanical storage devices, and optical storage devices. The server 110 may store data on an internal data storage device. In addition, the server may store data to and retrieve data from the data storage device 120 through the interconnection device 115.

One or more servers 110 may execute an operating system such as the AIX operating system from IBM. Each operating system may comprise one or more file systems. The file system comprises a logical organization of data for the operating system. In one embodiment, the file system comprises a plurality of inode entries as is well known to those skilled in the art. Each inode entry may be configured as a file, a directory, a device, or the like. A first directory inode may be linked to a table comprising a plurality of inode entries comprising the files, devices, and directories of the first directory. Each directory inode may include a table that includes inode entries for the directory. File and device inode entries may point to one or more data blocks or logical addresses comprising the file or device.

A logical volume may comprise the file system. In addition, the logical volume may include one or more logical partitions. Each logical partition may comprise a physical partition of a data storage device 120 or an internal data storage device. The data storage device 120 may be divided into one or more physical partitions.

The file system's ability to store data is constrained by the storage configuration of the logical volume. As used herein, the storage configuration includes organization of logical partitions of the logical volume and the amount of data storage available in the logical partitions of the logical volume. For example, if the logical volume comprised logical partitions totaling ten thousand gigabytes (10,000 GB) of data storage, the file system is limited to storing ten thousand gigabytes (10,000 GB) or less of data.

A software process such as an operating system or application may have a unique storage requirement. As used herein, storage requirement refers to the amount of data storage required by an operating system file system, an application, or the like. The storage requirement for a file system or an application may change over time. For example, the storage requirement of a transaction processing application may increase over time as the transaction processing application stores increasing amounts of transaction data. Similarly, the storage requirement of the operating system file system may increase as the storage requirements of one or more applications increase. In addition, the storage requirement may also decrease as a file system or application requires less storage.

An operator may modify the storage configuration for the logical volume of the file system such as by allocating additional logical partitions to the logical volume if the storage requirement for the file system increases. The operator may also modify the storage configuration by removing logical partitions from the logical volume if the storage requirement for the file system decreases. Unfortunately, if the operator fails to modify the storage configuration in a timely manner, the performance of applications employing the file system may be impaired. In addition, if the operator adds significantly more logical partitions to the logical volume than are needed, the cost of data storage for applications using the file system is unnecessarily increased.

The system 100 automatically matches the storage configuration for a logical volume to the storage requirement of the logical volume, fully supporting the operating system and applications using the logical volume while managing the cost of data storage. In addition, the system 100 analyzes trends in the system 100 state to be more responsive to changes in storage requirements.

Figure 2:
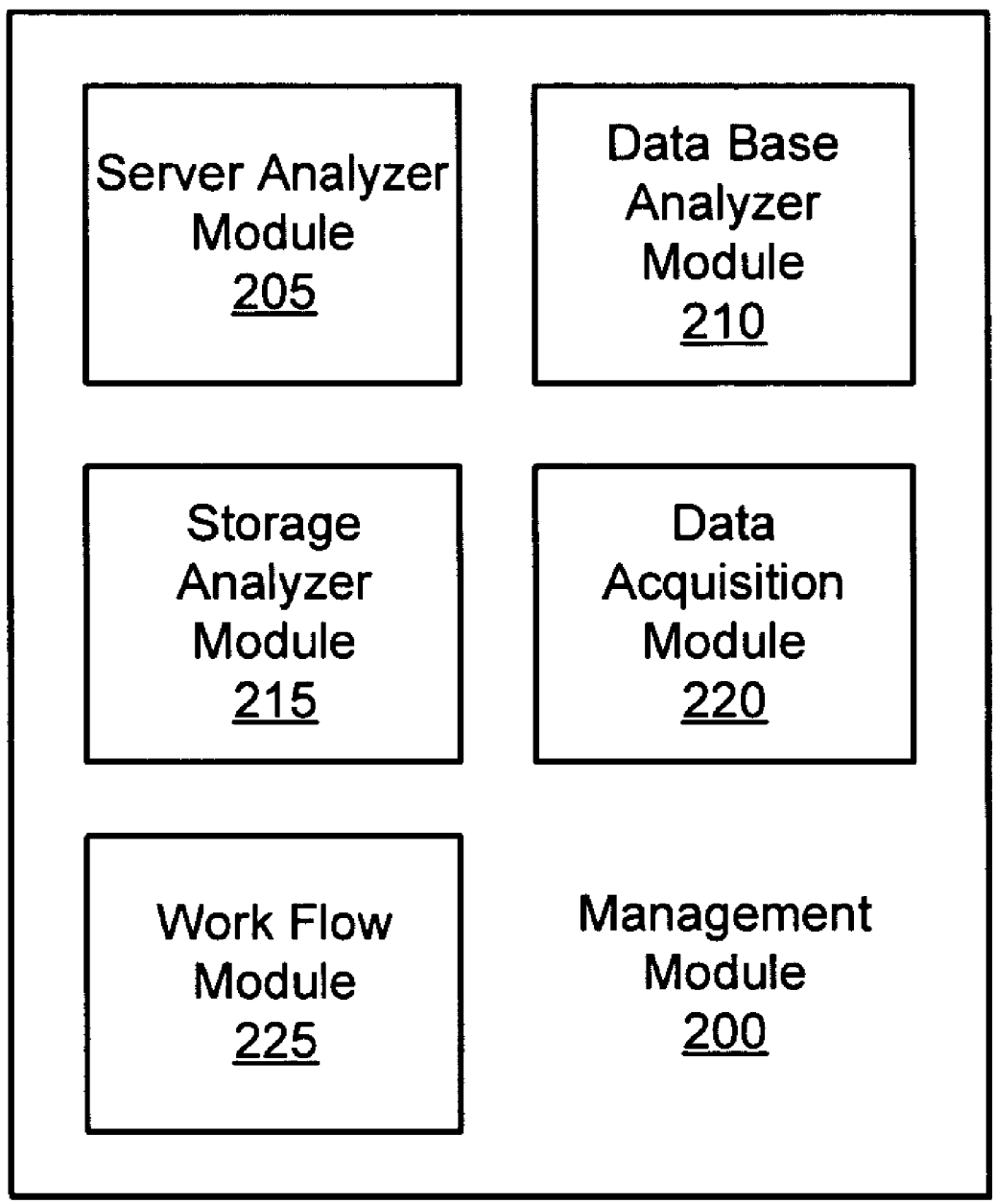
FIG. 2 is a schematic block diagram illustrating one embodiment of a management module of the present invention.

FIG. 2 is a schematic block diagram illustrating one embodiment of a management module 200 of the present invention. The management module 200 may execute on one or more servers 110 such as the servers 110 of FIG. 1. In one embodiment, the management module 200 is comprised by Tivoli system management software produced by IBM. In a certain embodiment, the Tivoli Intelligent Orchestrator of the Tivoli system management software comprises the management module 200. As depicted, the management module 200 includes a server analyzer module 205, a data base analyzer module 210, a storage analyzer module 215, a data acquisition module 220, and a workflow module 225. In one embodiment, the server analyzer module 205, the data base analyzer module 210, the storage analyzer module 215, the data acquisition module 220, and the workflow module 225 each comprise one or more software processes as is well known to those skilled in the art.

In one embodiment, the management module 200 is configured to support maintaining a service level agreement for a data processing system 100 such as the system 100 of FIG. 1. The service level agreement may specify one or more parameters critical to the satisfactory operation of the system 100. For example, the service level agreement may specify response latencies for clients in communication with the system. The service level agreement may also specify available data storage.

In one embodiment, the data acquisition module 220 acquires and distills system state data relating to the system 100. For example, the data acquisition module 220 may acquire system state data on a logical volume comprising one or more data storage devices 120 such as the data storage devices 120 of FIG. 1. In a certain embodiment, the system state data comprises the data storage consumption history for the system 100, or for one or more software processes executing on the system 100.

In one embodiment, the system state data may include the number of data blocks comprised by the logical volume and the number of data blocks used to store data by the logical volume. In one embodiment, the data acquisition module 220 distills the data block data into a storage fullness value. Storage fullness may be configured as the used storage space of a file system. For example, a storage fullness of eighty gigabytes (80 GB) may indicate that eighty gigabytes of the file system are consumed. In an alternate embodiment, storage fullness is configured as a percentage representing the percentage of the logical volume's data blocks that are used to store data. For example, a storage fullness of fifty percent (50%) may indicate that half of the logical volume's data blocks are in use storing data.

In one embodiment, a Tivoli Intelligent Orchestrator DataAcquisitionEngine comprises the data acquisition module 220. In addition, the data acquisition module 220 may communicate the storage fullness as a Tivoli Intelligent Orchestrator DataAcquisitionEngine signal type.

In one embodiment, the server analyzer module 205 is configured to provision a software process such as an operating system or an application with servers 110 such as the server 110 of FIG. 1. For example, the server analyzer module 205 may analyze the server 110 requirements for a web-based application. The server analyzer module 205 communicates a probability of breach signal that may indicate the probability that the system 100 will breach the service level agreement.

The management module 200 may determine that the web-based application requires one or more additional servers 110 in response to the probability of breach signal in order to prevent a breach of the service level agreement. In addition, the management module 200 may take one or more actions to reduce the probability of a service level agreement breach. In one embodiment, management module 200 directs the work flow module 225 to invoke one or more work flow processes in response to the probability of breach signal. The work flow process may add one or more servers 110 to the data base application to reduce the probability of a breach of the service level agreement. In a certain embodiment, the server analyzer module 205 is comprised by a worksphere application module of the Tivoli Intelligent Orchestrator.

In one embodiment, the data base analyzer module 210 is configured to monitor the central processor unit ("CPU") utilization by a software process such a data base application. If the data base analyzer module 210 communicates a probability of breach signal that may indicate the probability that the system 100 will breach the service level agreement. The management module 200 may take one or more actions to reduce the probability of a breach in response to the probability of breach signal. In one embodiment, the management module 200 directs the work flow module 225 to invoke one or more work flow processes in response to the probability of breach signal. For example, the work flow module 225 may invoke a work flow process that adds one or more CPUs to execute elements of the software process. In one embodiment, the data base analyzer module 210 is comprised by the Tivoli Intelligent Orchestrator DataAcquisitionEngine.

The storage analyzer module 215 receives the storage fullness from the data acquisition module 220. In addition, the storage analyzer module 215 may receive system state data from the data acquisition module 220. The storage analyzer module 215 may store the system state data for analysis. In one embodiment, the storage analyzer module 215 modifies the storage configuration for a file system and/or logical volume of a software process such as an operating system or a data base application. In an alternate embodiment, the storage analyzer module 215 communicates a probability of breach signal to the management module 200. The management module 200 may modify the storage configuration for the file system and/or logical volume in response to the probability of breach signal. In one embodiment, the storage analyzer module 215 is configured as a Tivoli Intelligent Orchestrator objective analyzer.

Figure 3:
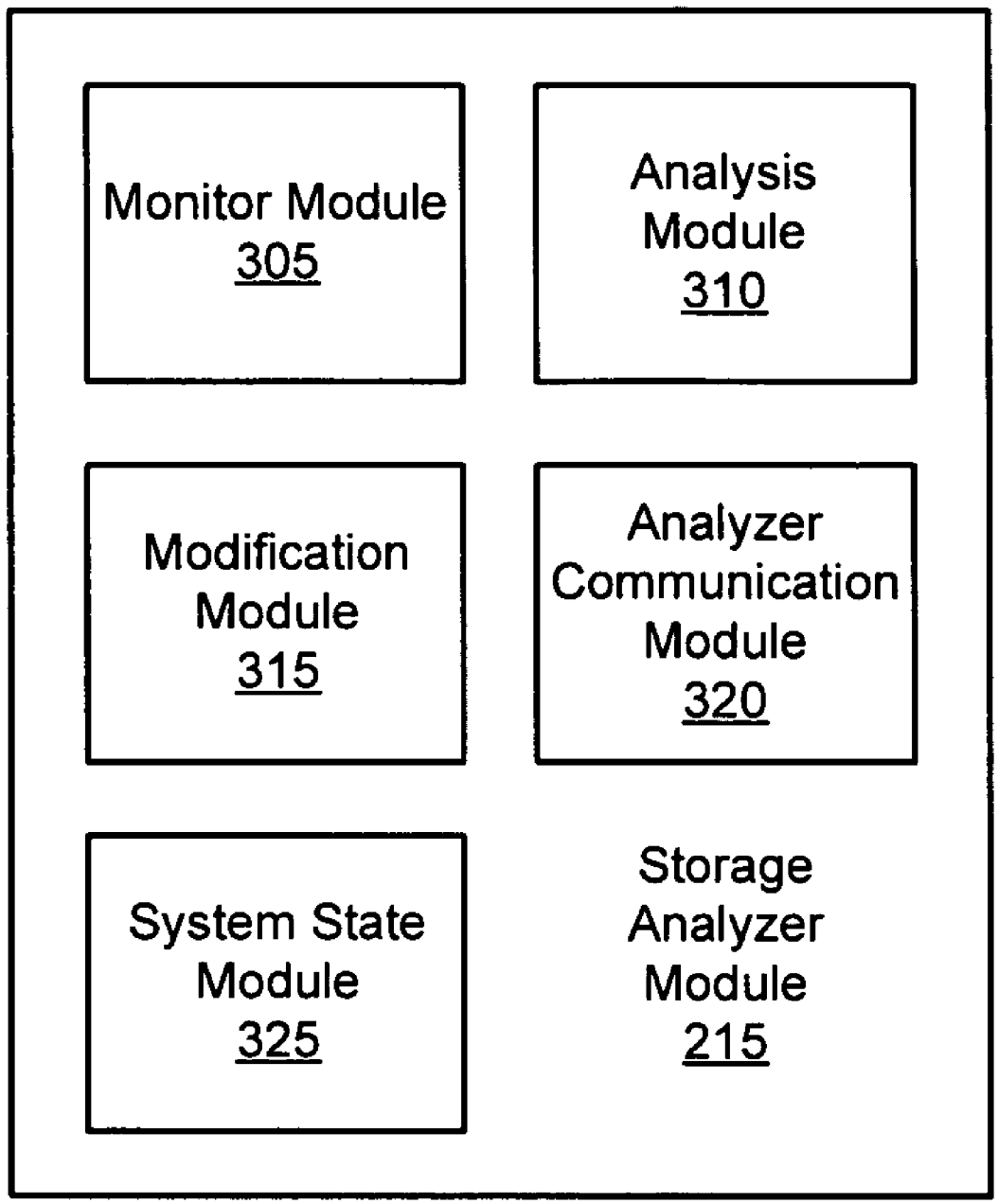
FIG. 3 is a schematic block diagram illustrating one embodiment of a storage analyzer module of the present invention.

FIG. 3 is a schematic block diagram illustrating one embodiment of a storage analyzer module 215 of the present invention. The storage analyzer module 215 may be the storage analyzer module 215 of FIG. 2. As depicted, the storage analyzer module 215 includes a monitor module 305, an analysis module 310, a modification module 315, an analyzer communication module 320, and a system state module 325. In one embodiment, the monitor module 305, analysis module 310, modification module 315, analyzer communication module 320, and system state module 325 are configured as one or more software processes executing on one or more servers 110 such as the servers 110 of FIG. 1.

The monitor module 305 monitors the storage fullness of a logical volume such as a logical volume comprising logical partitions of one or more data storage devices 120. The data storage devices 120 may be external data storage devices 120 such as the storage devices 120 of FIG. 1. The data storage devices 120 may also be internal to a server 110 such as a server 120 of FIG. 1.

The system state module 325 may acquire system state data. In one embodiment, the system state module 325 communicates with a data acquisition module 220 such as the data acquisition module 220 of FIG. 2. In addition, the system state module 325 may receive the system state data from the data acquisition module 220. In one embodiment, the system state module 325 stores system state data from the data acquisition module 220 for analysis. For example, the system state module 325 may receive data consumption system state data and store the data consumption system state data as a data consumption history. The data consumption history may comprise the storage fullness for a software process such as an operating system, transaction processing application, or data base application over a plurality of time intervals.

The analysis module 310 analyzes a system state. In a certain embodiment, the analysis module 310 synthesizes the system state from the system state data. For example, the analysis module 310 may analyze the data consumption history by calculating a system state comprising the slope of the storage fullness for a plurality of time intervals. The analysis module 310 may calculate the slope for all intervals between an arbitrary start time and end time.

The analysis module 310 also compares the system state to a trend algorithm. The trend algorithm may comprise one or more system state trends that forecast required changes in storage fullness. For example, the trend algorithm may comprise a specified slope of the data consumption history. The analysis module 310 may compare one or more slopes from the data consumption history with the specified trend algorithm slope. The analysis module 310 may determine if the system state substantially exceeds the trend algorithm. For example, if the slope of the data consumption history for a specified period exceeds the trend algorithm slope, the analysis module 310 may determine the system state exceeds the trend algorithm.

The modification module 315 may modify the storage configuration if the storage fullness exceeds a policy threshold. The policy threshold specifies a storage fullness. In one embodiment, the storage fullness is a maximum storage fullness. For example, the policy threshold may be specified as an eighty percent (80%) maximum storage fullness. The modification module 315 may modify the storage configuration such as by increasing the size of a file system if the storage fullness of the file system exceeds eighty percent (80%). In an alternate embodiment, the modification module 315 may modify the storage configuration by adding logical partitions to the logical volume if the storage fullness of the logical volume exceeds eighty percent (80%). By modifying the storage configuration, the storage analyzer module 215 may reduce the probability of a breach of a service level agreement for the storage fullness.

In an alternate embodiment, the storage fullness is a minimum storage fullness. For example, the policy threshold may be thirty percent (30%) and the modification module 315 may reduce the size of a file system and/or remove logical partitions from the logical volume if the storage fullness of the logical volume is less than thirty percent (30%). Thus the storage analyzer module 215 may reduce the data storage cost of the system 100 while maintaining an acceptable probability of a breach of the service level agreement for the storage fullness.

The modification module 315 also modifies the storage configuration if the storage fullness exceeds a discretionary threshold and the system state satisfies the trend algorithm. The discretionary threshold specifies a storage fullness with a lower probability of breach than the policy threshold. For example, if the policy threshold is eighty percent (80%), the discretionary threshold may be seventy-five percent (75%). A storage fullness that exceeds the discretionary threshold but does not exceed the policy threshold may indicate an increased probability of breaching the service level agreement when the trend algorithm is satisfied such that a storage configuration modification is warranted even though the storage fullness does not exceed the policy threshold.

The modification module 315 may modify the storage configuration such as by increasing the size of the file system and/or by adding logical partitions to the logical volume if the storage fullness exceeds the discretionary threshold of seventy-five percent (75%) and if the system state satisfies the trend algorithm. In one embodiment, the modification module 315 modifies the storage configuration by communicating a probability of breach signal to a management module 200 such as the management module 200 of FIG. 2. The management module 200 may direct a work flow module 225 such as the work flow module 225 of FIG. 2 to invoke one or more work flow processes to modify the storage configuration.

In one embodiment, the work flow module 225 may increase the storage configuration by increasing the size of the file system. For example, the work flow module 225 may invoke a work flow process that increases the size of a file system from four thousand gigabytes (4,000 GB) to five thousand gigabytes (5,000 GB). The work flow module 225 may subsequently increase the size of the logical volume comprising the file system by invoking a work flow process that adds logical partitions to the logical volume.

In an alternate embodiment, the work flow module 225 may decrease the storage configuration by invoking a work flow process that removes logical partitions from the logical volume. The work flow module 225 may subsequently invoke a work flow process that reduces the size of the file system.

In one embodiment, the analyzer communication module 320 may receive system state data from one or more analyzers such as the server analyzer module 205 or data base analyzer module 210 of FIG. 2. In addition, the analyzer communication module 320 may communicate system state data to the analyzer. For example, analyzer communication module 320 may communicate a first probability of breach signal to the server analyzer module 205 and the server analyzer module 205 may modify a second probability of breach signal in response to the first probability of breach signal. The storage analyzer module 215 automatically modifies the storage configuration to efficiently support storage requirements.

Figure 4:
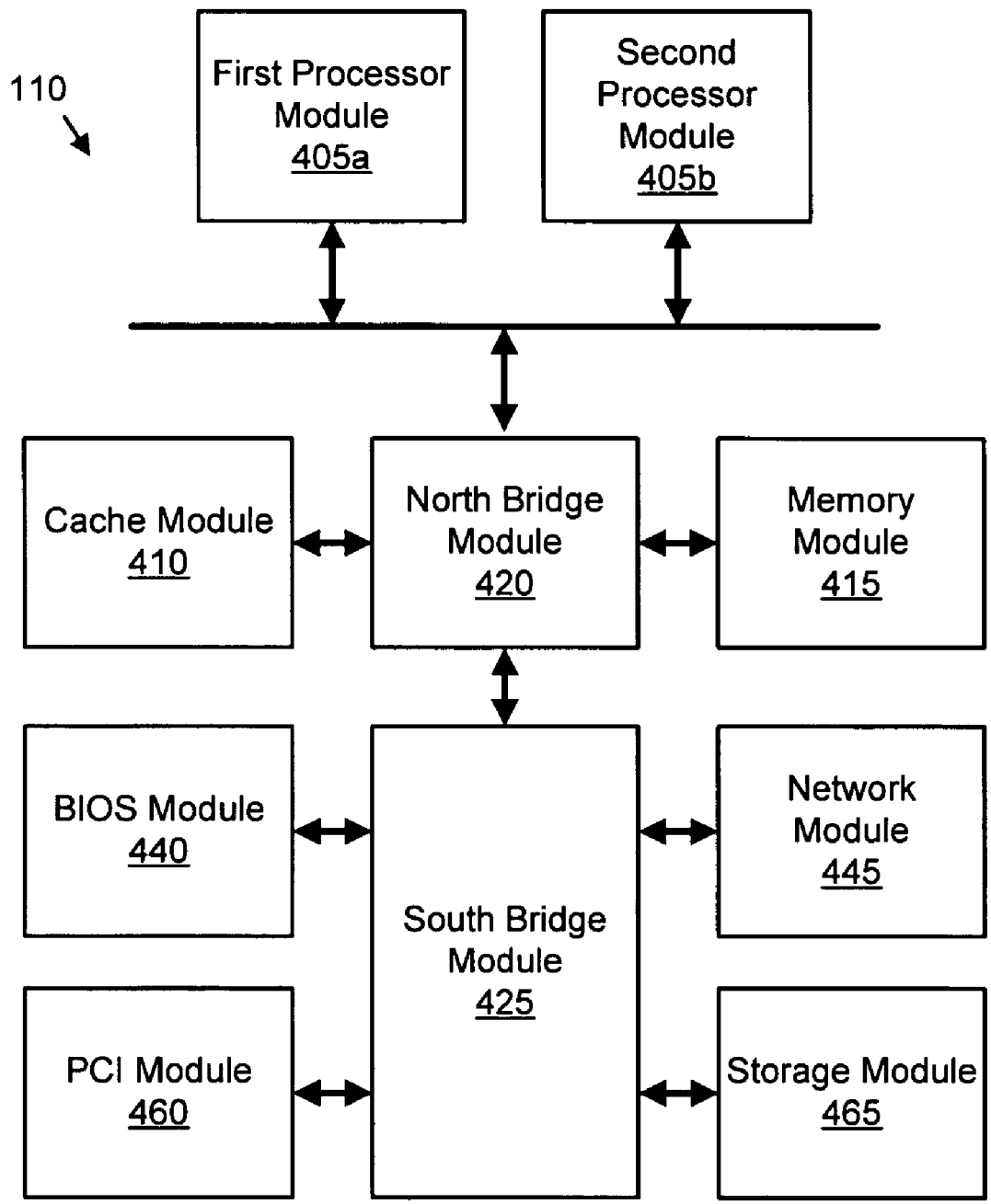
FIG. 4 is a schematic block diagram illustrating one embodiment of a server of the present invention.

FIG. 4 is a schematic block diagram illustrating one embodiment of a server 110 of the present invention. The server 110 may be the server 110 of FIG. 1. In the depicted embodiment, the server includes one or more processor modules 405, a cache module 410, a memory module 415, a north bridge module 420, a south bridge module 425, a basic input/output system ("BIOS") module 440, a network module 445, a peripheral component interconnect ("PCI") module 460, and a storage module 465.

The processor module 405, cache module 410, memory module 415, north bridge module 420, south bridge module 425, BIOS module 440, network module 445, PCI module 460, and storage module 465, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate to substrate wiring, or circuit card traces or wires connecting the semiconductor devices. In one embodiment, the storage module 465 comprises a hard disk drive, a micromechanical storage device, an optical storage device, or the like.

The memory module 415 stores software instructions and data. The processor module 405 executes the software instructions and manipulates the data as is well know to those skilled in the art. In one embodiment, the processor module 405 executes one or more software processes comprising the server analyzer module 205, data base analyzer module 210, storage analyzer module 215, data acquisition module 220, and workflow module 225 of FIG. 2.

In one embodiment, the data acquisition module 220 may acquire system state data by communicating with one or more devices such as a data storage device 120 of FIG. 1 through the storage module 465 and the network module 445. For example, the data acquisition module 220 may query the storage fullness of a hard disk drive through the storage module 220. In one embodiment, storage module 465 is a storage communication interface such as a Fibre Channel interface. The network module 445 may be an Ethernet interface, a token ring interface, or the like. The memory module 415 may store the system state data. In one embodiment, the memory module 415 stores the system state data as a data consumption history.

In one embodiment, the work flow module 225 invokes a work flow process by issuing one or more commands through the storage module 465 and/or the network module 445. The work flow module 225 may invoke the work flow process under the direction of the management module 200. For example, management module 200 may direct the work flow module 225 to issue one or more commands to an interconnection module 115 such as the interconnection module 115 of FIG. 1 through the storage module 465. The commands may direct the interconnection module 115 to assign one or more logical partitions to a logical volume to modify the logical volume's storage configuration.

In one embodiment, the processor module 405 executes one or more software processes comprising the monitor module 305, analysis module 310, modification module 315, analyzer communication module 320, and system state module 325 of FIG. 3. The monitor module 305, analysis module 310, modification module 315, analyzer communication module 320, and system state module 325 may communicate with each other and the server analyzer module 205, data base analyzer module 210, storage analyzer module 215, data acquisition module 220, and workflow module 225 through one or more designated memory locations in the memory module 415.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
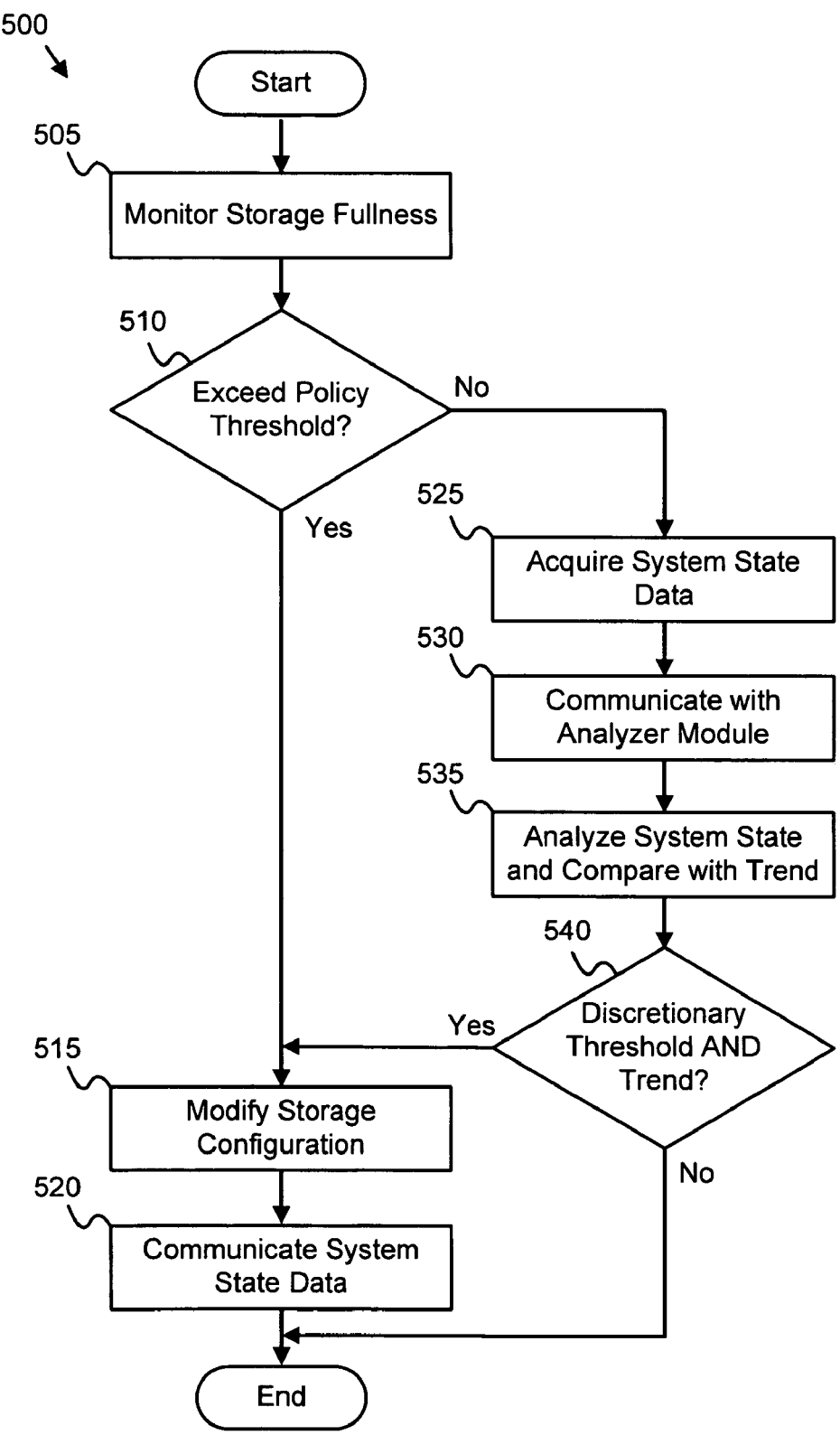
FIG. 5 is a schematic flow chart diagram illustrating one embodiment of a storage configuration modification method of the present invention.

FIG. 5 is a schematic flow chart diagram illustrating one embodiment of a storage configuration modification method 500 of the present invention. The method 500 substantially includes the steps necessary to carry out the functions presented above with respect to the operation of the described system 100 and modules 200, 215 of FIGS. 1-3.

The method 500 begins and a monitor module 305 such as the monitor module 305 of FIG. 3 monitors 505 a storage fullness of a storage configuration. The storage configuration may be for a file system of an operating system executing on one or more servers 110 such as the servers 110 of FIG. 1. Alternatively, the storage configuration may be for a logical volume. In one embodiment, a data acquisition module 220 such as the data acquisition module 220 of FIG. 2 acquires the storage fullness and communicates the storage fullness to the monitor module 305. The monitor module 305 may store the storage fullness as a history such as a data consumption history.

A modification module 315 such as the modification module 315 of FIG. 3 determines 510 if the storage fullness exceeds a policy threshold. For example, if the policy threshold is specified as nine thousand gigabytes (9,000 GB) and the storage fullness is measured as nine thousand five hundred gigabytes (9,500 GB), the modification module 315 determines 510 that the storage fullness exceeds the policy threshold.

If the modification module 315 determines 510 that the storage fullness does not exceed the policy threshold, a system state module 325 such as the system state module 325 of FIG. 3 may acquire 525 system state data that comprises a system state. In one embodiment, the system state data comprises data storage consumption data. The system state module 325 may store and analyze a plurality of data storage consumption data as a data storage history. The data storage consumption history may comprise a plurality of storage fullness values for a plurality of time intervals. For example, the history may include storage fullness values recorded daily over a thirty-day period.

In one embodiment, the system state data comprises storage input/output operation data. The storage input/output operation data may include a record of the total number of data storage device 120 operations during each of a plurality of time intervals. For example, the input/output storage data may comprise the total number of reads and writes to one or more storage devices 120 comprising the logical volume during each one-hour time interval over a seven day period.

In a certain embodiment, the system state data comprises a priority for an application. For example, a transaction processing application may be assigned a high priority. The high probability may be used to prioritize the modification of storage configurations among one or more applications.

In one embodiment, the system state data includes a broad-based policy. The broad-based policy may specify a policy threshold and/or a discretionary threshold. In a certain embodiment, the broad-based policy specifies a target maximum probability of breach of the service level agreement. For example, the broad-base policy may specify a policy threshold of seventy percent (70%) and a discretionary threshold of sixty percent (60%).

The system state data may include CPU usage data. The CPU usage data may comprise the percentage of CPU cycles that a CPU such as the processor module 405 of FIG. 4 is idle. In one embodiment, the CPU usage data comprises the average active cycles of a plurality of CPUs.

In one embodiment, an analyzer communication module 320 communicates 530 system state data with an analyzer module. The analyzer module may be the server analyzer module 205 or the data base analyzer module 210 of FIG. 2. In one embodiment, the analyzer communication module 320 receives system state data comprising an analysis and/or action of the analyzer module. For example, the server analyzer module 205 may communicate server provisioning modification information to the analyzer communication module 320. In an alternate example, the data base analyzer module 210 may communicate an analysis of potential modifications in CPU loading to the analyzer communication module 320. The data base analyzer module 210 may also communicate an analysis of potential modifications in CPU loading to the server analyzer module 205.

An analysis module 310 analyzes 535 the system state from the system state data and compares the system state with a trend algorithm. In one embodiment, the trend algorithm comprises one or more system state trends that increase the probability of a breach of a service level agreement such that the probability exceeds an acceptable level. For example, an acceptable probability of a breach of the service level agreement may be eighty percent (80%). The system state may satisfy the trend algorithm if a system state trend such as a specified number of storage input/output operations predicates an increase in the probability of a breach of the service level agreement beyond the specified probability of seventy-five percent (75%).

In one embodiment, the trend algorithm comprises a specified CPU usage rate. The system state may satisfy the trend algorithm if the system state CPU usage data value exceeds the specified CPU usage rate of the trend algorithm. In a certain embodiment, the trend algorithm comprises a specified number of storage input/output operations. The system state may satisfy the trend algorithm if the system state storage input/output operation value exceeds the specified number of storage input/output operations of the trend algorithm.

In one embodiment, the trend algorithm comprises a specified data storage consumption history and the slope of the storage fullness values. The system state may satisfy the trend algorithm if the slope of the system state data storage fullness values exceeds the specified storage fullness values' slope. The trend algorithm may also include a specified application priority value. The system state may satisfy the trend algorithm if a priority for an application such as a data base application exceeds the specified priority value.

The trend algorithm may also include an analysis and/or action of the analyzer module. For example, the trend algorithm may specify a server provisioning modification. The system state may satisfy the trend algorithm if the analyzer communication module 320 receives a communication indicating that the specified server provisioning modification is executed.

The modification module 315 determines 540 if the storage fullness exceeds a discretionary threshold and the system state satisfies the trend algorithm. If the modification module 315 determines 540 the storage fullness does not exceed the discretionary threshold or the system state does not satisfy the trend algorithm, the method 500 terminates. In one embodiment, the method 500 loops to monitor 505 storage fullness.

If the modification module 315 determines 510 that the storage fullness does exceed the policy threshold or if the modification module 315 determines 540 that the storage fullness exceeds the discretionary threshold and the system state satisfies the trend algorithm, the modification module 315 modifies 515 the storage configuration. In one embodiment, the storage configuration comprises the organization of the logical volume. The storage configuration may also comprise the size of a file system.

In one embodiment, the modification module 315 may heuristically modify the discretionary threshold and the trend algorithm. For example, the modification module 315 may learn that an increased storage configuration is more probably during December, and modify the discretionary threshold and/or trend algorithm to be more sensitive to changes in data consumption during December.

In one embodiment, the modification module 315 communicates a probability of breach signal comprising the exceeding of the policy threshold and/or the exceeding of the discretionary threshold and the system state satisfying the trend algorithm to a management module 200 such as the management module 200 of FIG. 2. The management module 200 may direct a work flow module 225 such as the work flow module 225 of FIG. 2 to invoke one or more work flow processes. The work flow process may modify the storage configuration by increasing or decreasing the size of the file system. Alternatively, the work flow process may modify the storage configuration by adding to or removing from the logical volume one or more data storage device 120 logical partitions comprising at least one physical partition.

For example, the modification module 315 may communicate a probability of breach signal indicating the exceeding of a discretionary threshold for minimum storage fullness, such as if the discretionary threshold is two thousand gigabytes (2,000 GB) and the storage fullness is one thousand nine hundred gigabytes (1,900 GB), and if the system state satisfied a specified trend algorithm of data consumption slope with a ten percent (10%) decline over a specified one week period. The management module 200 may direct the work flow module 225 to invoke one or more work flow processes that remove logical partitions from the logical volume. The management module 200 may further monitor the data consumption history before directing the work flow module 225 to invoke one or more work flow processes that reduce the size of the file system. For example, if the data consumption history slope did not increase for a day, the management module 200 may direct the work flow module 225 to reduce the size of the file system by five hundred gigabytes (500 GB).

In addition, an analyzer communication module 320 such as the analyzer communication module 320 of FIG. 3 may communicate 520 system state data to the analyzer such as the server analyzer module 205 and the data base analyzer module 210. In one embodiment, the analyzer communication module 320 communicates 520 that the modification module 315 modified 515 the storage configuration. The analyzer may employ the communicated system state data in executing analysis and management functions such as provisioning servers 110 or the like. The method 500 then terminates. In a certain embodiment, the method 500 loops to monitor 505 storage fullness. As depicted, the method 500 automatically modifies the storage configuration to meet storage requirements of a software process such as an operating system or a software application.

Figure 6A:
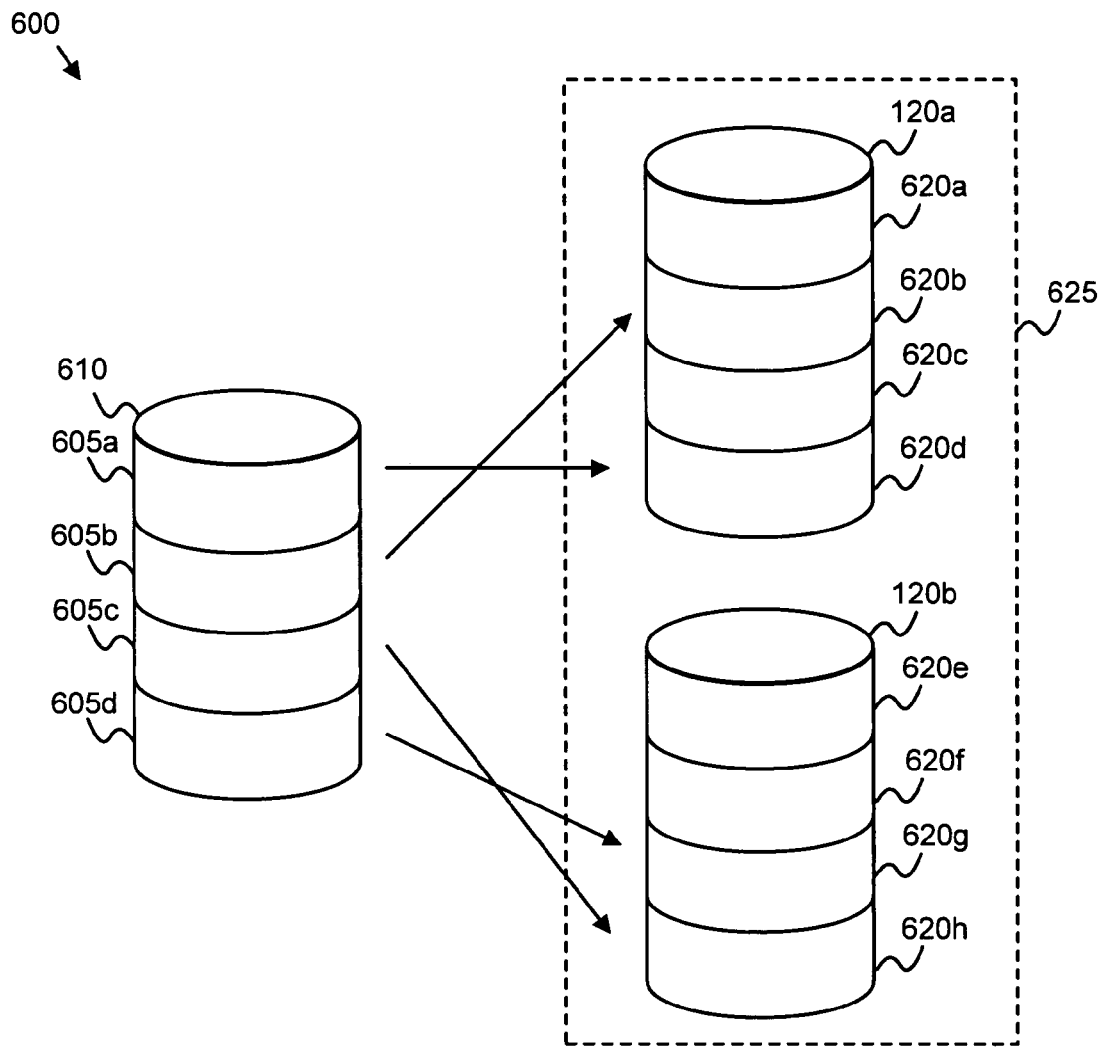
FIGS. 6a-c are schematic block diagrams illustrating one embodiment of storage configuration modification.

FIG. 6a is a schematic block diagram illustrating one embodiment of storage configuration 600 modification. A logical volume 610 is depicted as comprising a plurality of logical partitions 605. Each logical partition 605 corresponds to a physical partition 620 of one or more data storage devices 120 such as the data storage devices 120 of FIG. 1. The logical partitions 605 comprising the logical volume 610 are the storage configuration of the logical volume 610. The first and second data storage devices 120a, 120b comprise a volume group 625.

Figure 6B:
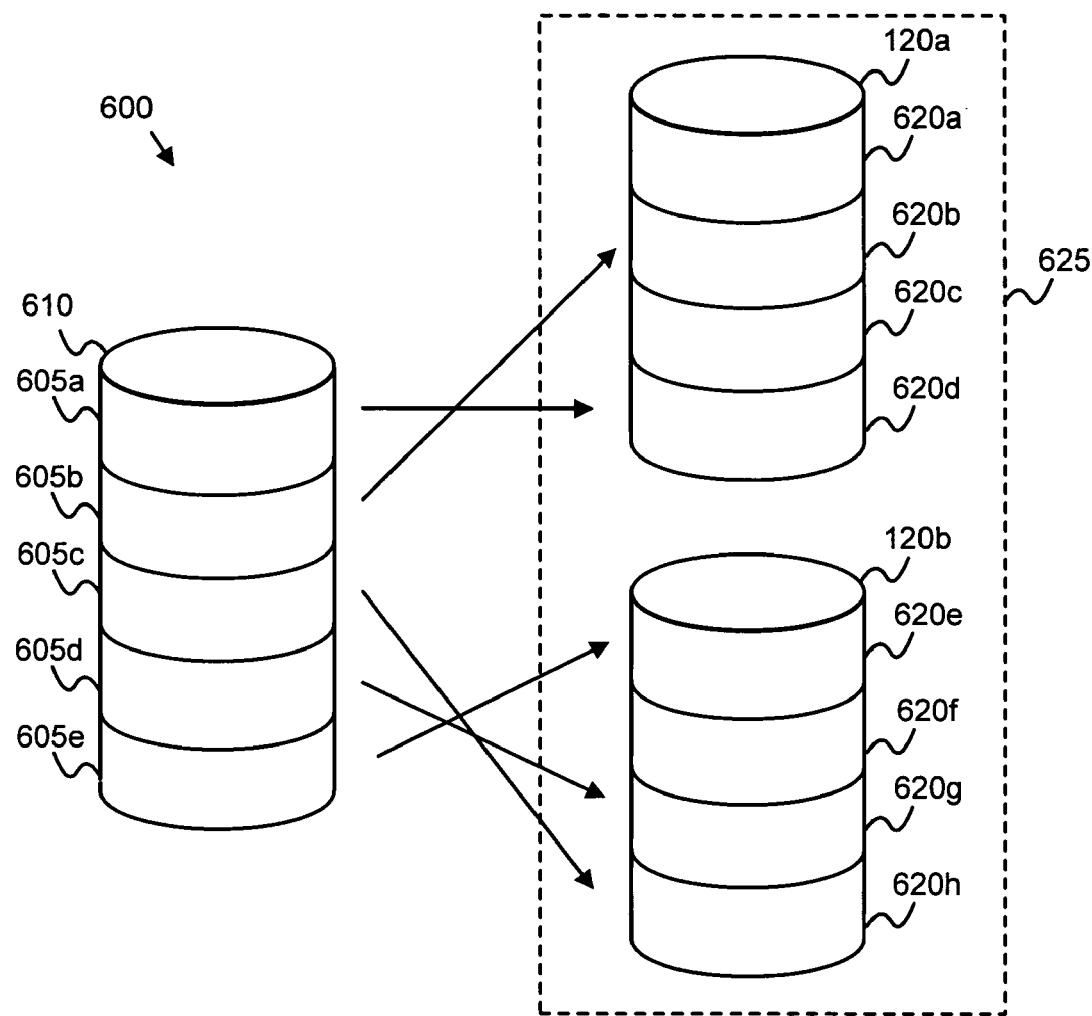

As depicted in FIG. 6b, a work flow module 225 such as the work flow module 225 of FIG. 2 modifies 515 the storage configuration 600 by adding a fifth logical partition 605e to the logical volume 610 of FIG. 6a. The fifth logical volume 605e corresponds to the first physical partition 620e of the second data storage device 120b of FIG. 6a.

Figure 6C:
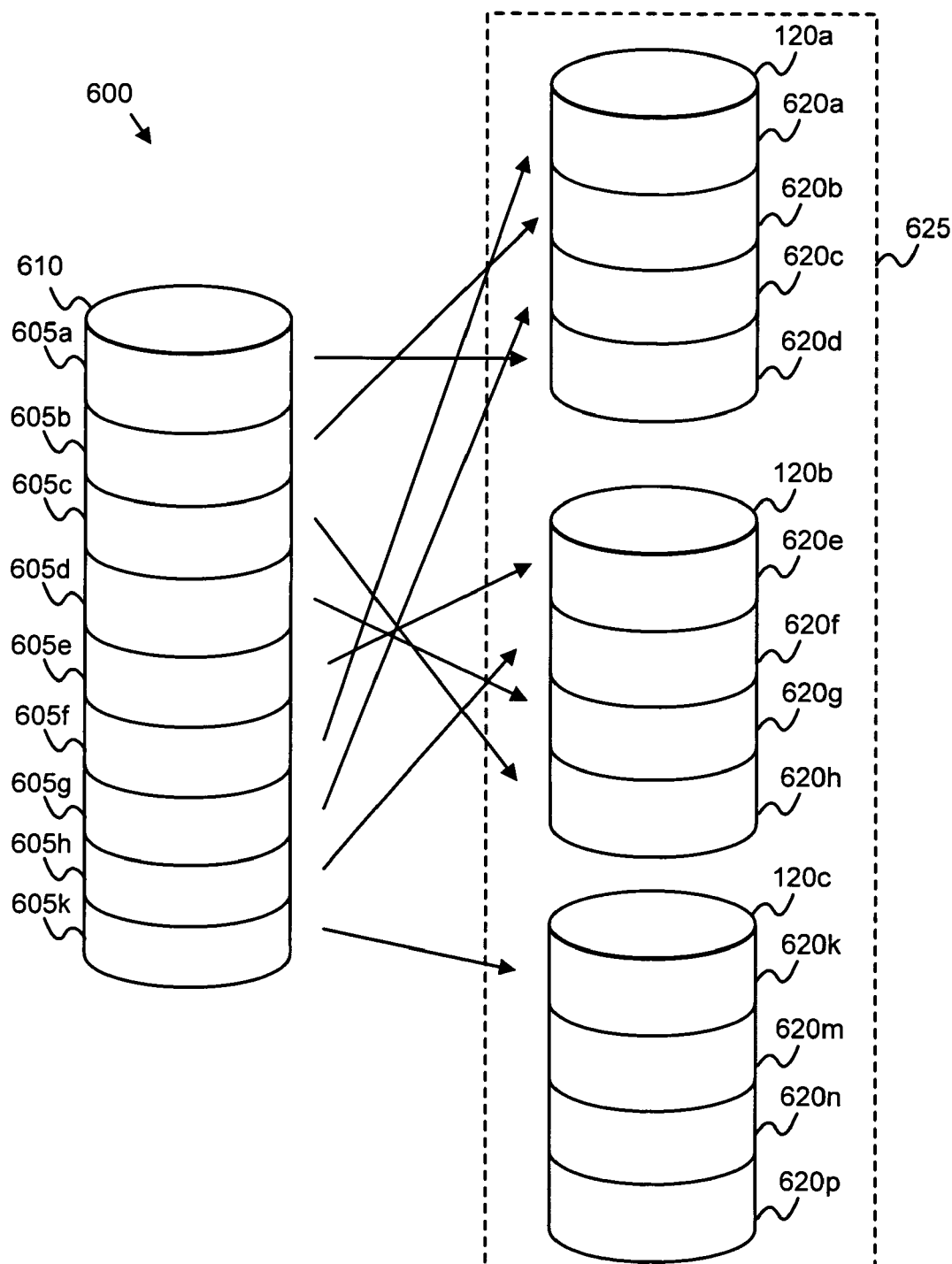

FIG. 6c depicts the work flow module 225 modifying 515 the storage configuration 600 of FIG. 6b by adding a sixth, seventh, eighth, and ninth logical partition 605f, 605g, 605h, 605k to the logical volume 610 of FIGS. 6a and 6b. The ninth logical partition 605k corresponds to the first physical partition 620k of a third data storage device 120c. The third data storage device 120c becomes part of the volume group 625.

The present invention automatically modifies a storage configuration to meet storage requirements. In addition, the present invention may automatically modify the storage configuration to satisfy storage requirements forecast by a trend algorithm. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to modify storage configuration, the apparatus comprising:

a monitor module comprising executable code stored on a storage device, executed by a processor, and configured to monitor a storage fullness of a storage configuration;

a system state module comprising executable code stored on the storage device, executed by the processor, and configured to acquire system state data, the system state data comprising storage input/output operation data comprising a record of a total number of data storage device operations during each of a plurality of time intervals, a priority for an application, and central processing unit usage data;

an analysis module comprising executable code stored on the storage device, executed by the processor, and configured to analyze a system state and compare the system state with a trend algorithm, wherein the trend algorithm comprises a probability of breach of a service level agreement, a specified number of input/output operations, a specified application priority value, and a specified central processing unit usage rate; and a modification module comprising executable code stored on the storage device, executed by the processor, and configured to modify the storage configuration by adding and removing logical partitions to a logical volume if the storage fullness exceeds a policy threshold and modify the storage configuration by adding and removing logical partitions to the logical volume if the storage fullness exceeds a discretionary threshold, the discretionary threshold lower than the policy threshold, and the system state satisfies the trend algorithm, wherein the system state satisfies the trend algorithm if the total number of data storage device operations predicate a breach of the service level agreement exceeding the probability of breach of the service level agreement, if the total number of data storage device operations exceed the specified number of input/output operations, if the central processing unit usage data exceeds the specified central processing unit usage rate, and if the priority for the application exceeds the specified application priority value, and wherein the modification module is further configured to heuristically modify the discretionary threshold and the trend algorithm to increased sensitivity to changes in a specified time interval.

2. The apparatus of claim 1, wherein the system state data comprises a data storage consumption history.

3. The apparatus of claim 1, wherein the system state data comprises a broad-based policy.

4. The apparatus of claim 1, further comprising an analyzer communication module comprising executable code stored on the storage device, executed by the processor, and configured to communicate system state data with an analyzer module.

5. A system to modify storage configuration, the system comprising:

a data storage device configured to store data;
a server;
a storage analyzer module comprising
a monitor module comprising executable code stored on a storage device, executed by a processor, and configured to monitor a storage fullness of a storage configuration of the data storage device;
a system state module comprising executable code stored on the storage device, executed by the processor, and configured to acquire system state data, the system state data comprising storage input/output operation data comprising a record of a total number of data storage device operations during each of a plurality of time intervals, a priority for an application, and central processing unit usage data;
an analysis module comprising executable code stored on the storage device, executed by the processor, and configured to analyze a system state of the server and the data storage device and compare the system state with a trend algorithm, wherein the trend algorithm comprises a probability of breach of a service level agreement, a specified number of input/output operations, a specified application priority value, and a specified central processing unit usage rate; and
a modification module comprising executable code stored on the storage device, executed by the processor, and configured to modify the storage configuration by adding and removing logical partitions to a logical volume if the storage fullness exceeds a policy threshold and modify the storage configuration by adding and removing logical partitions to the logical volume if the storage fullness exceeds a discretionary threshold, the discretionary threshold lower than the policy threshold, and the system state satisfies the trend algorithm, wherein the system state satisfies the trend algorithm if the total number of data storage device operations predicate a breach of the service level agreement exceeding the probability of breach of the service level agreement, if the total number of data storage device operations exceed the specified number of input/output operations, if the central processing unit usage data exceeds the specified central processing unit usage rate, and if the priority for the application exceeds the specified application priority value, and wherein the modification module is further configured to heuristically modify the discretionary threshold and the trend algorithm to increased sensitivity to changes in a specified time interval.

6. The system of claim 5, the storage analyzer module further comprising an analyzer communication module comprising executable code stored on the storage device, executed by the processor, and configured to communicate system state data with an analyzer module.

7. The system of claim 6, wherein the analyzer module is configured as a server analyzer module.

8. The system of claim 6, wherein the analyzer module is configured as a data base analyzer module.

9. A program of executable code stored on a storage device, executed by a processor, and configured to perform operations to modify storage configuration, the operations comprising:

monitoring a storage fullness of a storage configuration;
acquiring system state data, the system state data comprising storage input/output operation data comprising a record of a total number of data storage device operations during each of a plurality of time intervals, a priority for an application, and central processing unit usage data;
modifying the storage configuration by adding and removing logical partitions to a logical volume if the storage fullness exceeds a policy threshold;
modifying the storage configuration by adding and removing logical partitions to a logical volume if the storage fullness exceeds a discretionary threshold, the discretionary threshold lower than the policy threshold, and a system state satisfies a trend algorithm, wherein the trend algorithm comprises a probability of breach of a service level agreement, a specified number of input/output operations, a specified application priority value, and a specified central processing unit usage rate and the system state satisfies the trend algorithm if the total number of data storage device operations predicate a breach of the service level agreement exceeding the probability of breach of the service level agreement, if the total number of data storage device operations exceed the specified number of input/output operations, if the central processing unit usage data exceeds the specified central processing unit usage rate, and if the priority for the application exceeds the specified application priority value; and heuristically modifying the discretionary threshold and the trend algorithm to increased sensitivity to changes in a specified time interval.

10. The program of claim 9, wherein the system state data comprises a data storage consumption history.

11. The program of claim 9, wherein the system state data comprises a broad-based policy.

12. A method for deploying computer infrastructure, comprising integrating computer-readable code into a computing system, wherein the code in combination with the computing system is capable of performing the following:

monitoring a storage fullness of a storage configuration;

acquiring system state data, the system state data comprising storage input/output operation data comprising a record of a total number of data storage device operations during each of a plurality of time intervals, a priority for an application, and central processing unit usage data;

modifying the storage configuration by adding and removing logical partitions to a logical volume if the storage fullness exceeds a policy threshold;

modifying the storage configuration by adding and removing logical partitions to a logical volume if the storage fullness exceeds a discretionary threshold, the discretionary threshold lower than the policy threshold, and a system state satisfies a trend algorithm, wherein the trend algorithm comprises a probability of breach of a service level agreement, a specified number of input/output operations, a specified application priority value, and a specified central processing unit usage rate and the system state satisfies the trend algorithm if the total number of data storage device operations predicate a breach of the service level agreement exceeding the probability of breach of the service level agreement, if the total number of data storage device operations exceed the specified number of input/output operations, if the central processing unit usage data exceeds the specified central processing unit usage rate, and if the priority for the application exceeds the specified application priority value; and heuristically modifying the discretionary threshold and the trend algorithm to increased sensitivity to changes in a specified time interval.

* * * * *